Patented Sept. 27, 1932

1,879,502

UNITED STATES PATENT OFFICE

ERIK LUDVIG RINMAN, OF DJURSHOLM, SWEDEN

METHOD OF PRODUCING VALUABLE PRODUCTS FROM VEGETABLE SUBSTANCES

No Drawing. Application filed October 5, 1929, Serial No. 397,748, and in Sweden July 16, 1929.

I have previously described methods of producing valuable chemical products from vegetable substances of all kinds. These methods, however, have not come to very extensive use in practice for the reason that they have proved to be expensive both in erection and in operation. The present invention relates to a novel method of producing valuable products from vegetable substances by which a very inexpensive operation is attained, and simultaneously, the products obtained according to the novel method are more valuable than those obtained according to the old methods.

The present method is based on the fact discovered by me that vegetable substances of any kinds, when boiled with a water solution of barium hydroxide or strontium hydroxide, or a mixture thereof, are converted into substances which, when dry distilled, preferably in the presence of strong bases, give large quantities of valuable chemical products, such as alcohols, aldehydes, ketones, hydrocarbons, and hydrogen. The method thus consists principally in that the vegetable substances are first boiled with a strong solution of barium hydroxide or strontium hydroxide, or a mixture of both. The boiling or digestion is carried out at so high a temperature—which, however, does not need to exceed 200° C.—that the vegetable substances are decomposed and form compounds with the base or bases used.

The product obtained by the boiling, and which consists of substances soluble as well as substances practically insoluble in water, and which is more or less viscous depending upon the concentration, may, if necessary, be further mixed with substances which further the dry distillation, such as carbonates of the base or bases used, or carbon powder, after which it is evaporated to dryness and is dry distilled, preferably in the presence of superheated steam. Volatile chemical products, such as alcohols, aldehydes, ketones, hydrocarbons, and hydrogen, are then formed in greater or less quantities depending upon whether or not there were free basic hydroxides present during the dry distillation in considerable quantities. During the dry distillation these volatile substances distil over, together with the superheated steam, if used, and are recovered according to well-known methods. During the dry distillation a residue is also formed which consists of carbonate and possibly hydroxide of barium or strontium, or mixtures of both, depending upon which substance was used for the boiling, as well as carbon, irrespective of whether this substance was added or has been formed. These inorganic substances are regenerated by burning in a suitable manner, so that they are again obtained in the form in which they were originally used, for instance in the form of oxides or hydroxides, and may be used for boiling fresh quantities of vegetable substances.

In order to further illustrate the novel method the folowing details may be pointed out. Since the entire method is practically similar whether it is carried out with barium hydroxide alone, or with strontium hydroxide alone, or with mixtures of both, the following description only describes, for the sake of simplicity, a manner in which the method may be carried out with the use of barium hydroxide which is at present cheaper than strontium hydroxide.

For effecting the boiling no other chemicals than barium hydroxide are required. A small addition of soda or sodium hydroxide, however, may in certain cases facilitate the boiling. If the boiling is carried out with barium hydroxide, with or without addition of small quantities of soda or sodium hydroxide, the mass obtained after evaporation has a great tendency to react too lively during the dry distillation. It is therefore suitable, with a view to the dry distillation, to add substances which retard the reaction, or both retard the reaction and further the formation of valuable chemical products. One such substance is carbon powder, for instance charcoal powder, which may suitably be added before the boiling, since it does not in any way interfere with the same, but it may also be added after the boiling. Again, if for the said purpose inorganic substances are added, such addition should be made before the boiling, and they should therefore be so selected that they do not disturb the boiling, and so that they further the dry distillation and the regeneration of the barium hydroxide after the distillation.

Among such inorganic substances the following may be particularly mentioned, namely hydroxides or oxides of calcium, magnesium, aluminium, zinc, and iron. Of these substances calcium in the form of oxide or hydroxide is the most suitable one. It does not interfere with the carrying out of the boiling, and in the boiling as well as in the dry distillation it takes the place of some of the barium hydroxide, so that the quantity of this substance may be decreased. The lime also has a favorable influence on the regeneration of the barium hydroxide by burning. Magnesium acts in about the same manner as lime but less strongly, and this also applies to aluminium, zinc, and iron.

All kinds of vegetable substances, phanerogams as well as cryptogams, are suitable as raw materials. However, they must not be mouldered. Wood from foliferous trees, and reed, straw, and grass give as a rule a greater yield of chemical products than, for instance, wood from coniferous trees. The vegetable substances are best used in a subdivided state, for instance subdivided to the same size as ordinary wood chips or chopped straw for the pulp manufacture, or in the form of saw dust. The boiling is most suitably carried out in a rotary digester for direct heating with steam, and which is designed for a working pressure of 12 to 15 kg. per cm$^2$, so that during the boiling the temperature may be run up to about 185° C. without danger. The most suitable boiling temperature, however, is 180° C.

For a cook the digester is charged with the required quantity of vegetable substances which, if desired, have been mixed beforehand with the strong bases. In the continuous operation those bases are of course used for this purpose which are obtained by regeneration of the dry distillation residue. Of course, the vegetable substances and the chemicals may be mixed in the digester itself. When the substances has been mixed, water is pumped into the digester, preferably hot water and, if desired, such water as has previously been used in the manufacture for the recovery of chemicals carried along by gases. The quantity of water is preferably so chosen that for 1000 kg. dry vegetable matter 2 to 4 m$^3$ water are used, including the water already present in the mixture. A proportion of bases suitable for the digestion and dry distillation is obtained if for each 1000 kg. dry vegetable matter 2300 kg. $BaO_2H_2$ and 500 kg. CaO are used. With this addition of $BaO_2H_2$ and CaO the dry distillation gives a yield of about 150 kg. methyl alcohol, acetone, methyl-ethyl ketone, and acetone oils, 400 to 600 m$^3$ gas—hydrogen—and 75 kg. other oils, per 1000 kg. dry vegetable matter.

When the digester has been charged, it is put in rotation while the hot water is pumped in. A strong generation of heat is thereby caused. When this generation of heat has decreased, steam is introduced, so that the temperature in the digester increases to 180° C. This temperature is then maintained during 3 to 5 hours, after which the digestion is completed.

The digester is then blown down while recovering the heat of the exhaust steam, and substances present in the steam, such as methyl alcohol, turpentine, and ammonia, are collected and recovered according to well-known methods. When the cook has been blown down to a pressure of 2 to 3 kg. per cm$^2$, the digester contents are blown over to a suitable receptacle, for instance one provided with a stirring device. This receptacle may be adapted for indirect heating by means of steam or hot gases of combustion having a temperature of 200 to 300° C., so that the solution blown over and the sludge in the same can be evaporated in the receptacle in order to obtain a more viscous solution, which is termed thick liquor here below. This thick liquor is afterwards evaporated to a dry granular or pulverous mass which does not sinter or smelt when heated, but can be dry distilled in a continuously operated furnace provided with devices of the screw conveyer type for transporting the mass through the same.

The evaporation to dryness of the thick liquor may suitably be effected by means of drying cylinders which are heated by means of steam or hot gases and, optionally, also by means of air heated to about 150° C. These drying cylinders may be of the kind which receive the thick liquor on the outside of the cylinder shell and are heated internally, or of the kind which receive the thick liquor on the inside of the cylinder and are heated externally. In both cases the evaporation to dryness can be furthered by direct admission of hot air, and the dry evaporated mass can be scraped off in the usual manner by means of suitable scrapers.

Such drying cylinders may also be used in which the thick liquor is introduced at one end and the dry evaporated mass is removed at the other end. These furnaces are suitably heated externally by means of hot gases of combustion and internally by means of hot air. The dry evaporated mass is afterwards crushed to a suitable grain size, not exceeding 10 mm.

The mass evaporated to dryness in this manner may be dry distilled in any suitable manner, but preferably in a continuously operated stationary or rotary furnace, which is heated from the outside and is provided with conveying apparatus of the screw conveyer type for transporting the mass through the furnace. The mass is introduced in one end of the furnace through a suitable sluice device, in order to prevent air from entering the furnace, and is afterwards slowly fed, for instance in 4 to 8 hours' time, and with a slow increase of the temperature of the mass up to 400° to 500° C., to the other end of the furnace where the dry distillation residue is taken out through a sluice or water seal. Since this dry distillation gives a particularly good result when it is carried out in the presence of steam, which should preferably be superheated, it is suitable to introduce steam at both ends of the furnace. For this purpose the steam formed during the evaporation of the thick liquor may be used, provided that it is free from air. The distillate may be discharged at any point. If it is discharged in the vicinity of the cooler end of the furnace, however, the heat value of the dry distillation gases is better utilized.

A good aid in the heating of the mass in the furnace is obtained by superheating the steam blown into the hottest end of the furnace to 400° to 500° C.

For the carrying out of the dry distillation it is important that the conveyer apparatus of the furnace are so arranged that they do not obstruct the flow of the gases through the furnace. It is therefore suitable to use a screw having a discontinuous screw surface, or other similar apparatus, which convey the mass with the least possible formation of dust. The gases of combustion required for heating the furnace are admitted at that end of the furnace where the mass is removed from the same, and should have a temperature of 500° to 700° C. They are then allowed to sweep around the furnace, or at least over its bottom, to the other end of the furnace where they pass off at a temperature of about 200° C.

The distillate discharged from the furnace is suitably first conducted through a dust collector for separating the dust. The distillate is afterwards condensed in the usual manner by cooling to room temperature, so that the substances capable of condensation are condensed as completely as possible and are separated from the gases, which mainly consist of hydrogen (90 per cent). The condensed products are afterwards separated in a Florence flask, which separates the oils from the aqueous part of the distillate. The oils may afterwards be purified by hydrogenization and rectification. The aqueous distillate is treated in a continuous column, so that a concentrate holding about 96 per cent, and consisting of methyl alcohol, acetone, methyl-ethyl ketone, and acetone oils, is obtained.

Since the raw distillate usually contains ammonia it is suitable to use, for the separation of the products, a double column, so that the ammonia may be separated in the second column by washing with sulphuric acid. This is for the reason that it is not very suitable to add the acid to the raw distillate, since pitching will then easily be caused in the column, and the ammonium compound formed will be more diluted and contaminated. The column should also be provided with a separator for the acetone oil. It it is desired from the raw concentrate to produce the different products in a pure state, this may be effected with the aid of strong caustic soda lye according to methods previously described by applicant. However, the methyl-ethyl ketone and the acetone oils will then be obtained mixed with water. In order to remove this water, treatment with unslaked lime may suitably be used. If it is desired to utilize all substances present in the raw concentrate as motor fuel, the same are suitably hydrogenized with hydrogen, whereby very stable products are obtained. Since the hydrogen obtained from the dry distillation holds a very high percentage, it may be used, after suitable purification, for such hydrogenization and for the synthetic production of ammonia.

The dry distillation residue, whether removed in a wet or in a dry state, is subjected to burning for the purpose of regenerating the barium hydroxide in the state of oxide or hydroxide, as well as those inorganic substances which were added and which will then be obtained as oxides. If among said substances there are aluminium, zinc, or iron, these substances will be obtained chemically combined with barium.

The burning is effected according to known methods. It is furthered by the introduction of steam, so that barium is obtained in the state of hydrate, or chemically combined, as above stated. Thus, red heating in a steam atmosphere is sufficient to completely convert the barium carbonate into hydroxide. The burning is also more easily performed if the barium carbonate is mixed with calcium carbonate and carbon.

Regarding the details of the method the following points should also be noted. The quantity of the chemicals used may be varied in many ways. A combination giving a good result has been stated here above. The quantity of barium may be varied from 1200 to 3600 kg. $BaO_2H_2$ per 1000 kg. dry vegetable matter. The quantity of lime may be varied from 300 to 700 kg. CaO. If aluminium oxide is used, the quantity of the same is suitably chosen equivalent to the quantity of barium. If lime is simultaneously present, the quantity of aluminium oxide need not be chosen greater.

Since the reaction between barium hydroxide and vegetable matter is due to the fact that the lignin compound with barium is very soluble in the solution of substances which are formed by the barium hydroxide and the hydrocarbons of the vegetable matter, the digestion is most easily effected at a high concentration of said substances. Also calcium hydroxide is dissolved to a considerable extent in said solution, and thus contributes to carry through the reaction. If an addition of soda or sodium hydroxide is used in the digestion, it should suitably be chosen so small that it does not interfere with the burning of the barium carbonate, since otherwise the complication will arise that the excess of soda must be leached out of the dry distillation residue before the burning. Otherwise, an addition of soda has the effect that during the dry distillation the reaction takes a more quiet course.

When evaporating the thick liquor to dryness before introducing the same in the dry distillation furnace, the temperature should preferably not exceed 150° C. since at a higher temperature the mass begins to decompose.

The dry distillation begins already at about 180° C., and is lively at 190° C. when heat is developed. The reaction remains lively up to 300° C., and runs afterwards more quietly. The development of hydrogen is very lively up to 300° C., but decreases afterwards, again to become lively at 400° C. and to increase up to 500° C. The hydrogen developed at temperatures above 400° C. is formed by decomposition of steam in the presence of carbon and barium hydroxide.

The development of acetone and methyl-ethyl ketone mainly takes place below 400° C. Thus, if the chief aim is to obtain a yield of the last mentioned products, the temperature during the dry distillation need not be run higher than to about 400° C. Since the dry distillation requires a supply of only very little heat, electric heating of the distillation furnace may suitably be used.

In the above description it has been assumed that the evaporation to dryness and the dry distillation of the thick liquor are carried out in separate apparatus. It is also possible, however, to carry out the evaporation to dryness as well as the dry distillation in one and the same apparatus, for instance, in a rotary furnace.

As stated here above the barium compounds used in the present method may be replaced by the corresponding strontium compounds, and the term "barium" used in the claims should therefore be understood as being equivalent to strontium.

Also, since as above stated, instead of calcium hydroxide, other substances such as calcium oxide or oxides or hydroxides of magnesium, aluminium, zinc, or iron, may be used, the term "calcium hydroxide" used in the claims should be understood as being equivalent to said substances.

I claim:

1. The method of producing valuable products from the body substances of vegetation, which comprises digesting the vegetable substances with a water solution of barium hydroxide at an elevated temperature and pressure until said substances are substantially all completely decomposed and form compounds with said hydroxide, evaporating the solution thus obtained to dryness, and subjecting the evaporated mass to dry distillation.

2. The method of producing valuable products from the body substances of vegetation, which comprises digesting the vegetable substances with a water solution of barium hydroxide at an elevated temperature and pressure until said substances are substantially all completely decomposed and form compounds with said hydroxide, adding carbonate of barium to the solution thus obtained, evaporating the solution to dryness, and subjecting the evaporated mass to dry distillation.

3. The method of producing valuable products from the body substances of vegetation which comprises digesting the vegetable substances with a water solution of barium hydroxide at an elevated temperature and pressure until said substances are substantially all completely decomposed and form compounds with said hydroxide, evaporating the solution thus obtained to dryness, and subjecting the evaporated mass to dry distillation in the presence of superheated steam.

4. The method of producing valuable products from the body substances of vegetation, which comprises digesting the vegetable substances at an elevated temperature and pressure with a water solution of barium hydroxide containing calcium hydroxide until said substances are substantially all completely decomposed and form compounds with the hydroxides, evaporating the solution thus obtained to dryness, and subjecting the evaporated mass to dry distillation.

5. The method of producing valuable products from the body substances of vegetation, which comprises digesting the vegetable substances at an elevated temperature and pressure with a water solution of barium hydroxide containing calcium hydroxide until said substances are substantially all completely decomposed and form compounds with the hydroxides, adding carbonates of barium and calcium to the solution thus obtained, evaporating the solution to dryness, and subjecting the evaporated mass to dry distillation.

6. The method of producing valuable products from the body substances of vegetation, which comprises digesting the vegetable substances at an elevated temperature and pressure with a water solution of barium hydroxide containing calcium hydroxide until said substances are substantially all completely decomposed and form compounds with the hydroxides, evaporating the solution thus obtained to dryness, and subjecting the evaporated mass to dry distillation in the presence of superheated steam.

7. The method of treating the body substances of vegetation, which comprises digesting the vegetable substances at an elevated temperature and pressure with a water solution of barium hydroxide until said substances are substantially all completely decomposed and form compounds with said hydroxide.

ERIK LUDVIG RINMAN.